(12) United States Patent
Ishibashi et al.

(10) Patent No.: US 10,675,844 B2
(45) Date of Patent: Jun. 9, 2020

(54) GLASS PANEL UNIT AND BUILDING COMPONENT INCLUDING THE SAME

(71) Applicant: PANASONIC INTELLECTUAL PROPERTY MANAGEMENT CO., LTD., Osaka (JP)

(72) Inventors: Tasuku Ishibashi, Osaka (JP); Eiichi Uriu, Osaka (JP); Kazuya Hasegawa, Osaka (JP); Masataka Nonaka, Osaka (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/084,633

(22) PCT Filed: Mar. 13, 2017

(86) PCT No.: PCT/JP2017/009869
§ 371 (c)(1),
(2) Date: Sep. 13, 2018

(87) PCT Pub. No.: WO2017/169677
PCT Pub. Date: Oct. 5, 2017

(65) Prior Publication Data
US 2019/0077122 A1    Mar. 14, 2019

(30) Foreign Application Priority Data

Mar. 31, 2016   (JP) .................................. 2016-072502

(51) Int. Cl.
*B32B 17/10*   (2006.01)
*C03C 27/06*   (2006.01)
(Continued)

(52) U.S. Cl.
CPC ........ *B32B 17/10064* (2013.01); *C03C 27/06* (2013.01); *E06B 3/663* (2013.01);
(Continued)

(58) Field of Classification Search
CPC ... B32B 17/10064; E06B 3/677; E06B 3/663; C03C 27/06
(Continued)

(56) References Cited

U.S. PATENT DOCUMENTS 2,303,897 A * 12/1942 Smith ................. E06B 3/66361
                                                            52/172
4,001,994 A * 1/1977 Williams .............. E06B 3/6205
                                                            52/204.597
(Continued)

FOREIGN PATENT DOCUMENTS

JP    2000-087656 A    3/2000
JP    2004-149343 A    5/2004
(Continued)

OTHER PUBLICATIONS

Extended European Search Report issued in corresponding European Patent Application No. 17774221.0, dated Feb. 22, 2019.
(Continued)

*Primary Examiner* — Patrick J Maestri
*Assistant Examiner* — Joseph J. Sadlon
(74) *Attorney, Agent, or Firm* — McDermott Will & Emery LLP

(57) ABSTRACT

A glass panel unit includes a first glass panel, a second glass panel, a sealing portion in a frame shape, and a getter. The sealing portion hermetically bonds together respective peripheral portions of the first glass panel and the second glass panel. An inner space is formed at a reduced pressure between the first glass panel and the second glass panel. The getter is arranged in the inner space. The getter is arranged (Continued)

in a frame region extending along the sealing portion and located within a predetermined distance from each peripheral edge of the glass panel unit, so as to be covered with a building component frame.

6 Claims, 10 Drawing Sheets

(51) Int. Cl.
*E06B 3/677* (2006.01)
*E06B 3/67* (2006.01)
*E06B 3/663* (2006.01)
*E06B 3/66* (2006.01)

(52) U.S. Cl.
CPC .............. *E06B 3/6612* (2013.01); *E06B 3/67* (2013.01); *E06B 3/677* (2013.01)

(58) Field of Classification Search
USPC ...................................................... 52/786.13
See application file for complete search history.

(56) References Cited

U.S. PATENT DOCUMENTS

| | | | | |
|---|---|---|---|---|
| 4,164,085 A * | 8/1979 | Steeb | ......................... | B42C 7/00 |
| | | | | 281/31 |
| 4,305,773 A * | 12/1981 | Hendricks | ................. | B30B 5/02 |
| | | | | 100/295 |
| 4,307,551 A * | 12/1981 | Crandell | ............. | E04F 13/0808 |
| | | | | 52/204.591 |
| 5,079,054 A * | 1/1992 | Davies | ................... | B29C 70/52 |
| | | | | 428/213 |
| 5,489,321 A * | 2/1996 | Tracy | .................... | C03B 23/245 |
| | | | | 65/43 |
| 5,664,395 A * | 9/1997 | Collins | ................. | E06B 3/6612 |
| | | | | 52/786.13 |
| 5,985,069 A * | 11/1999 | Kawabe | ................ | B05C 5/0216 |
| | | | | 156/109 |
| 6,109,994 A * | 8/2000 | Cho | ......................... | H01J 9/261 |
| | | | | 445/25 |
| 6,387,460 B1 * | 5/2002 | Shukuri | ................ | E06B 3/6612 |
| | | | | 428/34 |
| 6,479,112 B1 * | 11/2002 | Shukuri | ................ | E06B 3/6612 |
| | | | | 428/34 |
| 6,537,121 B1 * | 3/2003 | Baret | ....................... | H01J 9/261 |
| | | | | 315/169.4 |
| 6,635,321 B2 * | 10/2003 | Wang | ...................... | C03B 27/00 |
| | | | | 428/34 |
| 6,793,990 B1 * | 9/2004 | Sakaguchi | .......... | E06B 3/66357 |
| | | | | 428/34 |
| 6,830,791 B1 | 12/2004 | Misonou et al. | | |
| 8,499,508 B2 * | 8/2013 | Sonderkær | ................ | E06B 3/66 |
| | | | | 52/204.593 |
| 9,803,819 B2 * | 10/2017 | Sciascia | ................ | F21V 33/006 |
| 10,180,606 B2 * | 1/2019 | Mullins | .................... | E06B 9/24 |
| 2011/0296771 A1 | 12/2011 | Miller et al. | | |
| 2016/0001524 A1 | 1/2016 | Abe et al. | | |

FOREIGN PATENT DOCUMENTS

| | | |
|---|---|---|
| WO | 2011026479 A2 | 3/2011 |
| WO | 2014/136151 A1 | 9/2014 |

OTHER PUBLICATIONS

International Search Report and Written Opinion issued in International Patent Application No. PCT/JP2017/009869, dated May 23, 2017; with partial English translation.

* cited by examiner

GLASS PANEL UNIT AND BUILDING COMPONENT INCLUDING THE SAME

CROSS-REFERENCE OF RELATED APPLICATIONS

This application is the U.S. National Phase under 35 U.S.C. § 371 of International Patent Application No. PCT/JP2017/009869, filed on Mar. 13, 2017, which in turn claims the benefit of Japanese Application No. 2016-072502, filed on Mar. 31, 2016, the entire disclosures of which Applications are incorporated by reference herein.

TECHNICAL FIELD

The present disclosure relates to a glass panel unit and a building component including the glass panel unit, and more particularly relates to a glass panel unit with an inner space formed at a reduced pressure between a first glass panel and a second glass panel and a building component including such a glass panel unit.

BACKGROUND ART

A thermally insulating glass panel unit is obtained by reducing the pressure in an inner space between a pair of glass panels that are arranged to face each other and hermetically sealing the inner space while maintaining the reduced pressure there (see, for example, Patent Literature 1).

A glass panel unit of this type suitably includes a gas-adsorbing getter to maintain a degree of vacuum in the inner space for a long period of time.

CITATION LIST

Patent Literature

Patent Literature 1: JP 2004-149343 A

SUMMARY

It is therefore an object of the present disclosure to provide a glass panel unit in which a getter is arranged in its inner space so as to be much less easily visible from the outside and also provide a building component including such a glass panel unit.

A glass panel unit according to one aspect of the present disclosure includes a first glass panel, a second glass panel, a sealing portion in a frame shape, and a getter to adsorb a gas.

The second glass panel is arranged to face the first glass panel. The sealing portion hermetically bonds together respective peripheral portions of the first glass panel and the second glass panel so as to create an inner space which is hermetically sealed at a reduced pressure between the first glass panel and the second glass panel. The getter is arranged in the inner space.

The getter is arranged in a frame region, extending along the sealing portion, of the inner space so as to be covered with a building component frame when the building component frame is attached onto the glass panel unit. The frame region is located within a predetermined distance from each peripheral edge of the glass panel unit.

A building component according to another aspect of the present disclosure includes: the glass panel unit; and a building component frame fitted into a peripheral portion of the glass panel unit. The getter is covered with the building component frame.

DESCRIPTION OF EMBODIMENTS

An exemplary embodiment of a glass panel unit will be described with reference to the accompanying drawings. Note that on those drawings, respective constituent members of a glass panel unit according to the exemplary embodiment are depicted only schematically.

Figure 1:
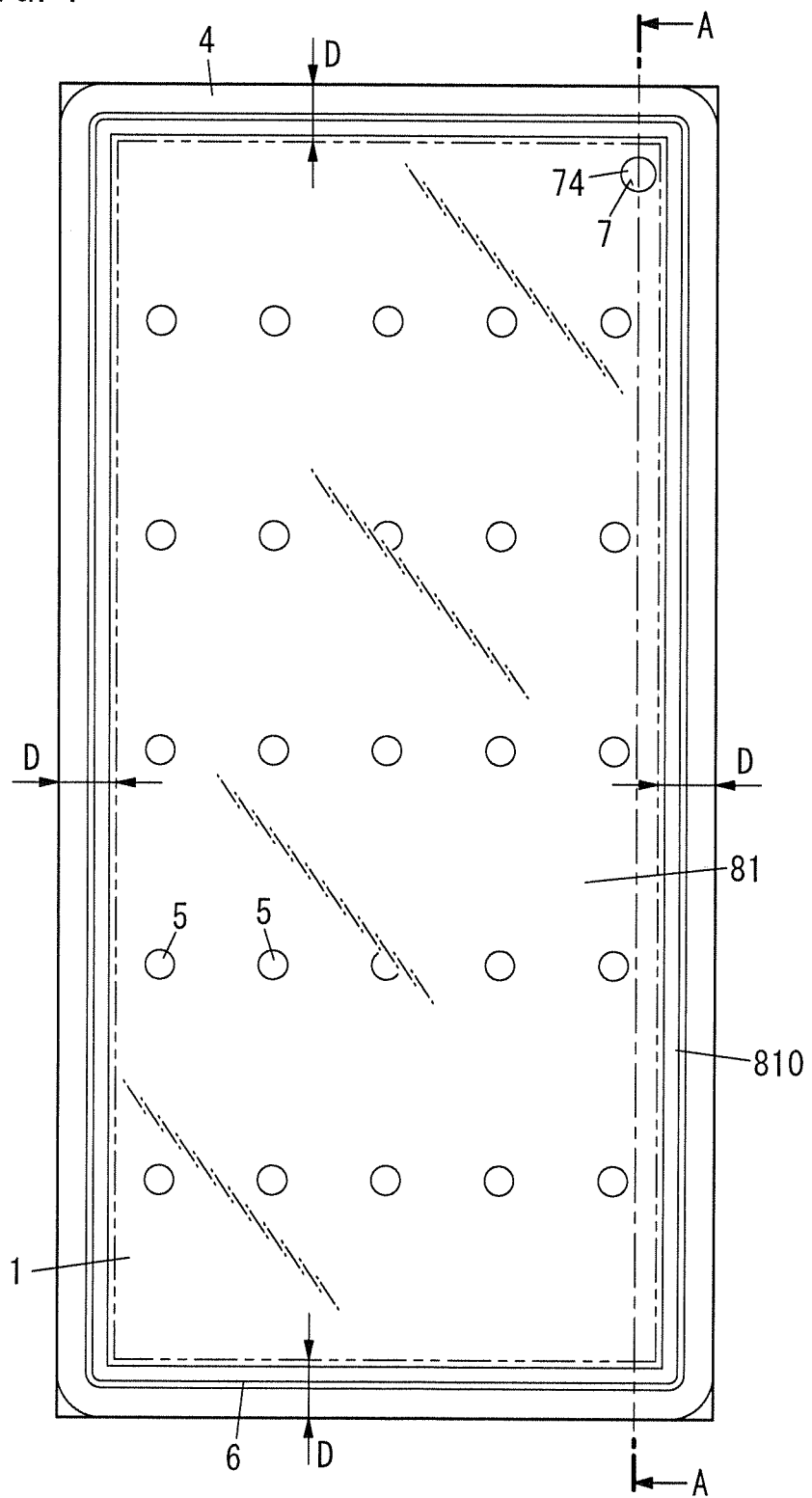
FIG. 1 is a plan view of a glass panel unit according to an exemplary embodiment.
Figure 2:
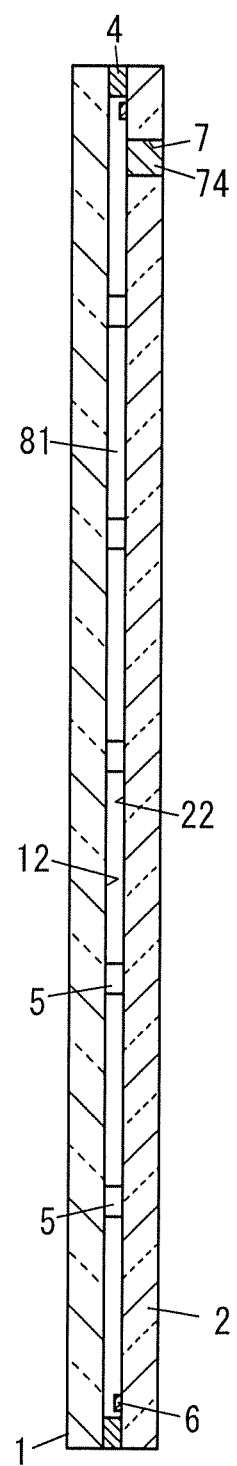
FIG. 2 is a cross-sectional view thereof taken along a plane A-A shown in FIG. 1.

As shown in FIGS. 1 and 2, a glass panel unit according to this exemplary embodiment includes a first glass panel 1, a second glass panel 2, a sealing portion 4, a plurality of (multiple) spacers 5, and a getter 6.

The first glass panel 1 and the second glass panel 2 are arranged to face each other. The first glass panel 1 and the second glass panel 2 are parallel to each other. Between the first glass panel 1 and the second glass panel 2, located are the sealing portion 4, the plurality of spacers 5, and the getter 6. An inner space 81 surrounded with the sealing portion 4 in a frame shape is formed between the first glass panel 1 and the second glass panel 2. That is to say, the plurality of spacers 5 and the getter 6 are located in the inner space 81.

The first glass panel 1 and the second glass panel 2 may be configured as any of various types of glass panels made of soda lime glass, high strain point glass, chemically toughened glass, alkali-free glass, quartz glass, Neoceram, thermally toughened glass, or any other suitable glass.

The sealing portion 4 is formed by applying, using a dispenser or any other suitable applicator, a glass fit in a frame shape onto a counter surface 22 of the second glass panel 2 and then heating the glass frit sandwiched between respective counter surfaces 12 and 22 of the first and second glass panels 1 and 2. Respective peripheral portions of the first and second glass panels 1 and 2 are hermetically sealed up with the sealing portion 4. Alternatively, the glass fit may be applied onto the counter surface 12 of the first glass panel 1 or may even be applied onto both of the counter surfaces 12 and 22 of the first and second glass panels 1 and 2.

The plurality of spacers 5 are dispersed so as to be spaced apart from each other. Each of the spacers 5 is arranged in contact with both of the respective counter surfaces 12 and 22 of the first and second glass panels 1 and 2 (see FIG. 2).

Optionally, at least one of the respective counter surfaces 12 and 22 of the first and second glass panels 1 and 2 may be coated with an infrared reflective film, for example.

The plurality of spacers 5 are arranged so as to be surrounded with the sealing portion 4 in the frame shape. The plurality of spacers 5 are used to maintain a predetermined gap between the first and second glass panels 1 and 2. The plurality of spacers 5 are suitably either transparent or semi-transparent. The material, dimensions, shape, arrangement pattern, and other parameters of the plurality of spacers 5 may be determined appropriately.

In the glass panel unit according to this exemplary embodiment, an exhaust port 7 is provided for the second glass panel 2, out of the two glass panels (namely, the first and second glass panels 1 and 2) (see FIG. 2). The exhaust port 7 may be hermetically sealed up with a sealing material 74. However, this is only an example and should not be construed as limiting. Alternatively, the exhaust port 7 may also be sealed up in any other manner. Besides, the exhaust port 7 may be provided for the first glass panel 1 instead, or may even be provided for each of the first and second glass panels 1 and 2.

The getter 6 is a member configured to adsorb molecules of a gas, and is arranged to be spaced from the plurality of spacers 5. The getter 6 may be applied, with a dispenser or any other suitable applicator, onto the counter surface 22 of the second glass panel 2. Alternatively, the getter 6 may be arranged on the counter surface 12 of the first glass panel 1 instead, or may even be arranged on both of the respective counter surfaces 12 and 22 of the first and second glass panels 1 and 2.

The getter 6 is arranged in a frame region 810, extending along the sealing portion 4 in the rectangular frame shape, inside the inner space 81. The frame region 810 is a region located within a predetermined distance D from each peripheral edge of the glass panel unit. In FIG. 1, the frame region 810 and the inner region located inside of the frame region 810 are separated from each other by a two-dot chain rectangle.

The getter 6 arranged in the frame region 810 in the rectangular frame shape will be covered with a building component frame 9 (to be described later) and will be much less easily visible from the front and rear sides (see FIG. 3) when the building component frame 9 is attached to a peripheral portion of the glass panel unit.

In this exemplary embodiment, the predetermined distance D is set at 10 cm. However, this value is only an example and should not be construed as limiting. Alternatively, the predetermined distance D may also be set at 8 cm or may even be set at 12 cm, for example. The getter 6 is arranged along the entire perimeter of the frame region 810, while the plurality of spacers 5 and the exhaust port 7 are located in the inner region inside of the frame region 810. In this exemplary embodiment, a narrow gap of about 1 cm is left over the entire perimeter between the sealing portion 4 and the getter 6. However, this is only an example and should not be construed as limiting. Alternatively, the sealing portion 4 and the getter 6 may also be in contact with each other either along the entire perimeter or only partially along the perimeter.

The inner space 81, surrounded with the sealing portion 4 in the frame shape between the first and second glass panels 1 and 2, is hermetically sealed out from the outside by sealing up the exhaust port 7 communicating with the inner space 81. The hermetically sealed inner space 81 may be a thermally insulated space, of which the pressure has been reduced to a degree of vacuum of 0.1 Pa or less, for example.

The presence of the inner space 81 at a reduced pressure between the first and second glass panels 1 and 2 imparts excellent thermal insulation properties to the glass panel unit according to this exemplary embodiment.

In addition, in the glass panel unit according to this exemplary embodiment, arranging the getter 6 in the frame shape along the perimeter of the inner space 81 at the reduced pressure allows a degree of vacuum to be maintained in the inner space 81 for a long period of time.

Next, a building component including the glass panel unit according to this exemplary embodiment (hereinafter referred to as a "building component according to this exemplary embodiment") will be described.

Figure 3:
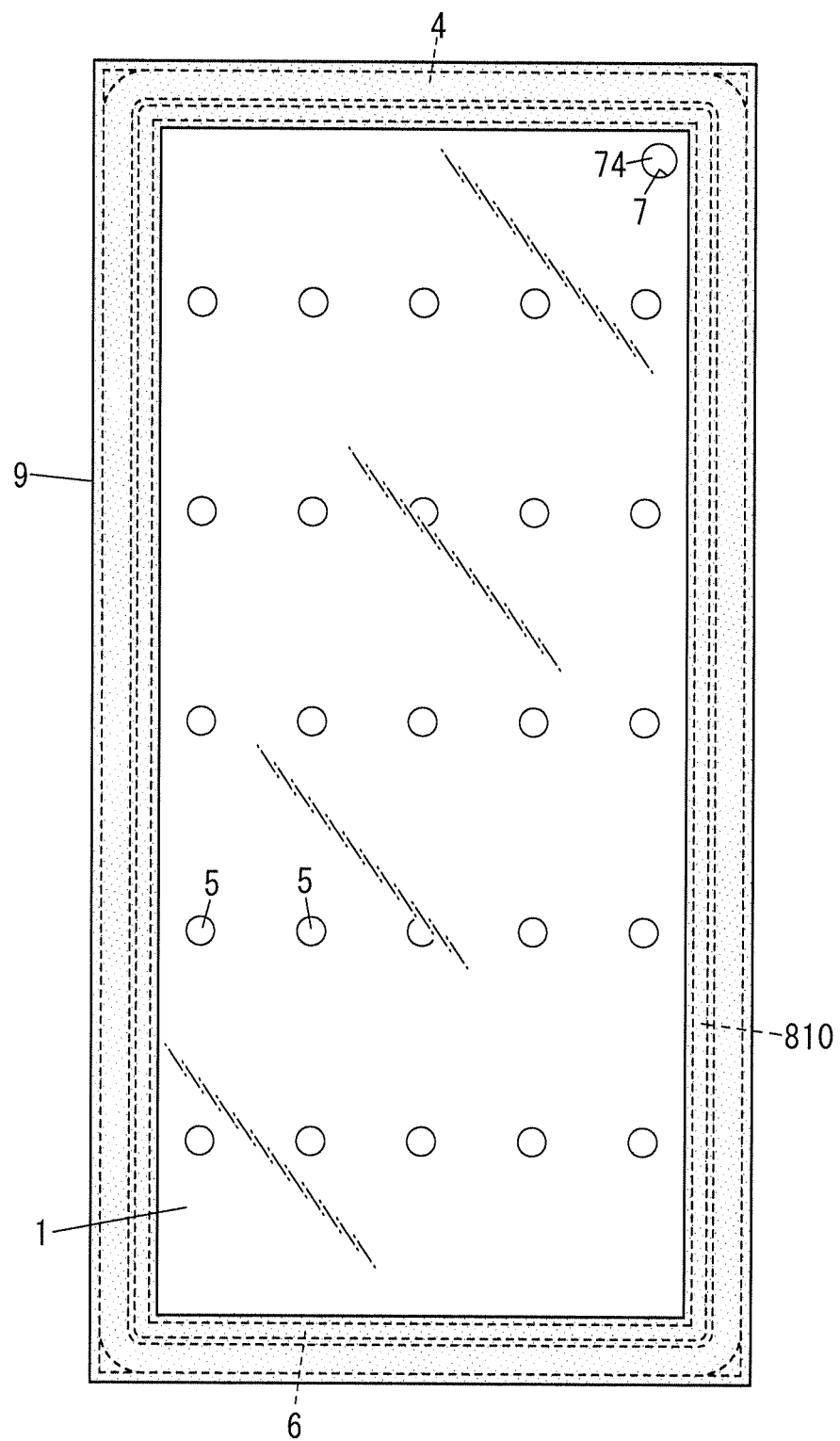
FIG. 3 is a plan view of a building component including the glass panel unit.

FIG. 3 illustrates a building component according to this exemplary embodiment. In this building component, a building component frame 9 is fitted into the glass panel unit according to this exemplary embodiment.

The building component frame 9 may be a window frame, for example. The building component shown in FIG. 3 is an assembly of window components including the glass panel unit according to this exemplary embodiment. However, this is only an example and should not be construed as limiting. Examples of other building components include an entrance door and a room door, to name just a few.

As described above, in the glass panel unit according to this exemplary embodiment, the getter 6 is arranged along the entire perimeter of the frame region 810, extending along the sealing portion 4, in the inner space 81 of the glass panel unit. In the building component according to this exemplary embodiment, when the building component frame 9 with a width of about 10 cm is fitted into a peripheral portion of the glass panel unit, the entire frame region 810 is covered with the building component frame 9. This allows the sealing portion 4 and the getter 6 located inside the sealing portion 4 to be both covered with the building component frame 9 and much less easily visible from the outside.

Next, a glass panel unit according to a first variation of the exemplary embodiment and a building component including the glass panel unit will be described with reference to FIGS. 4 and 5.

In the following description, any constituent member of the glass panel unit and building component according to the first variation, having the same function as a counterpart of the exemplary embodiment described above with reference to FIGS. 1-3, will be designated by the same reference numeral as that counterpart's, and a detailed description thereof will be omitted herein.

Figure 4:
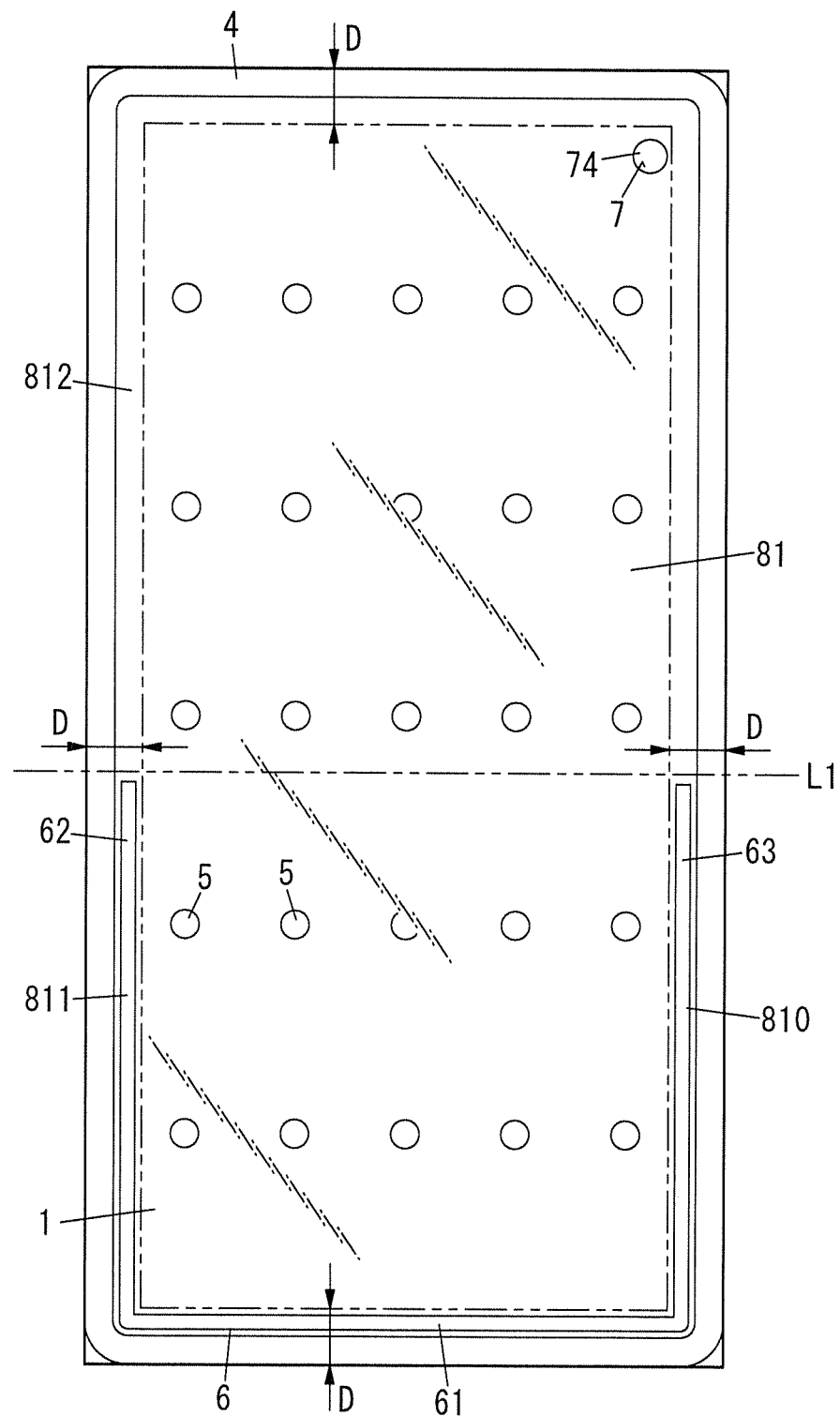
FIG. 4 is a plan view of a glass panel unit according to a first variation.
Figure 5:
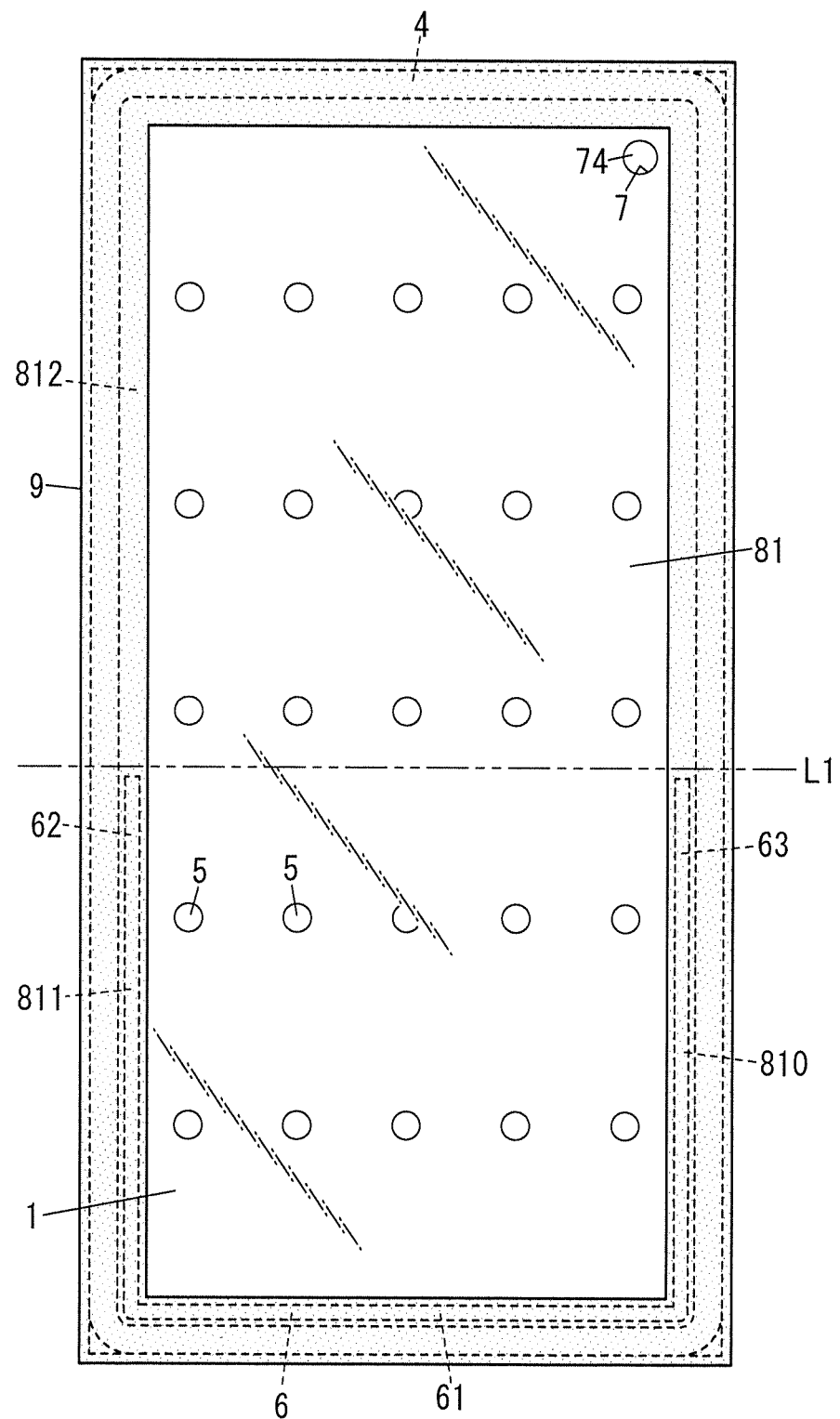
FIG. 5 is a plan view of a building component including the glass panel unit.

In the glass panel unit according to the first variation, the getter 6 is not arranged along the entire perimeter of the frame region 810 but arranged in only a first sub-region 811 of the frame region 810 as shown in FIG. 4 and other drawings.

The first sub-region 811 forms one part, located on one side in a predetermined direction (e.g., the vertical direction in this example), of the frame region 810. The rest of the frame region 810, other than the first sub-region 811, is a second sub-region 812. The second sub-region 812 forms the other part, located on the other side in the predetermined direction, of the frame region 810. The first sub-region 811 and the second sub-region 812 are separated from each other by a virtual boundary line L1 shown in FIG. 4.

The first sub-region 811 will be located, when a building component is formed by attaching the building component frame 9 into the glass panel unit according to the first variation (see FIG. 5), in a lower part of the building component installed. More specifically, in this variation, the first sub-region 811 forms a lower half of the frame region 810 when the building component is installed.

The second sub-region 812 will be located, when a building component is formed by attaching the building component frame 9 into the glass panel unit according to the first variation, in an upper part of the building component installed. More specifically, in this variation, the second sub-region 812 forms an upper half of the frame region 810 when the building component is installed. That is to say, when the building component is installed, the first sub-region 811 will be located under the second sub-region 812.

The getter 6 includes a linear portion 61 extending along one side of the glass panel unit (corresponding to a bottom edge of the building component installed), another linear portion 62 extending along another side (corresponding to a left edge thereof) adjacent to the one side of the glass panel unit, and still another linear portion 63 extending along still another side (corresponding to a right edge thereof) adjacent to the one side of the glass panel unit.

In the following description, these linear portions 61, 62, and 63 will be hereinafter referred to as a "first linear portion 61," a "second linear portion 62," and a "third linear portion 63," respectively, to distinguish them from each other.

The second linear portion 62 extends from one end of the first linear portion 61 perpendicularly to the first linear portion 61 (i.e., upward). The third linear portion 63 extends from the other end of the first linear portion 61 perpendicularly to the first linear portion 61 (i.e., upward). Thus, in this variation, the getter 6 has a generally U shape as a whole.

However, this is only an exemplary shape of the getter 6 and should not be construed as limiting. Alternatively, the linear portion 61 may be discontinuous with the linear portion 62 or with the linear portion 63, for example.

In the building component according to the first variation, the sealing portion 4 and the getter 6 are also arranged within the predetermined distance D from each peripheral edge of the glass panel unit, and the sealing portion 4 and the getter 6 located inside of the sealing portion 4 are both covered with the building component frame 9 and much less easily visible.

In addition, in the building component according to the first variation, the getter 6 is arranged in the first sub-region 811 that is located in a lower portion of the building component installed, thus making, even if a portion of the getter 6 dropped after the installation, that dropped portion hidden behind the building component frame 9 and much less easily visible, which is one of the advantages to be achieved by the present disclosure.

Figure 6:
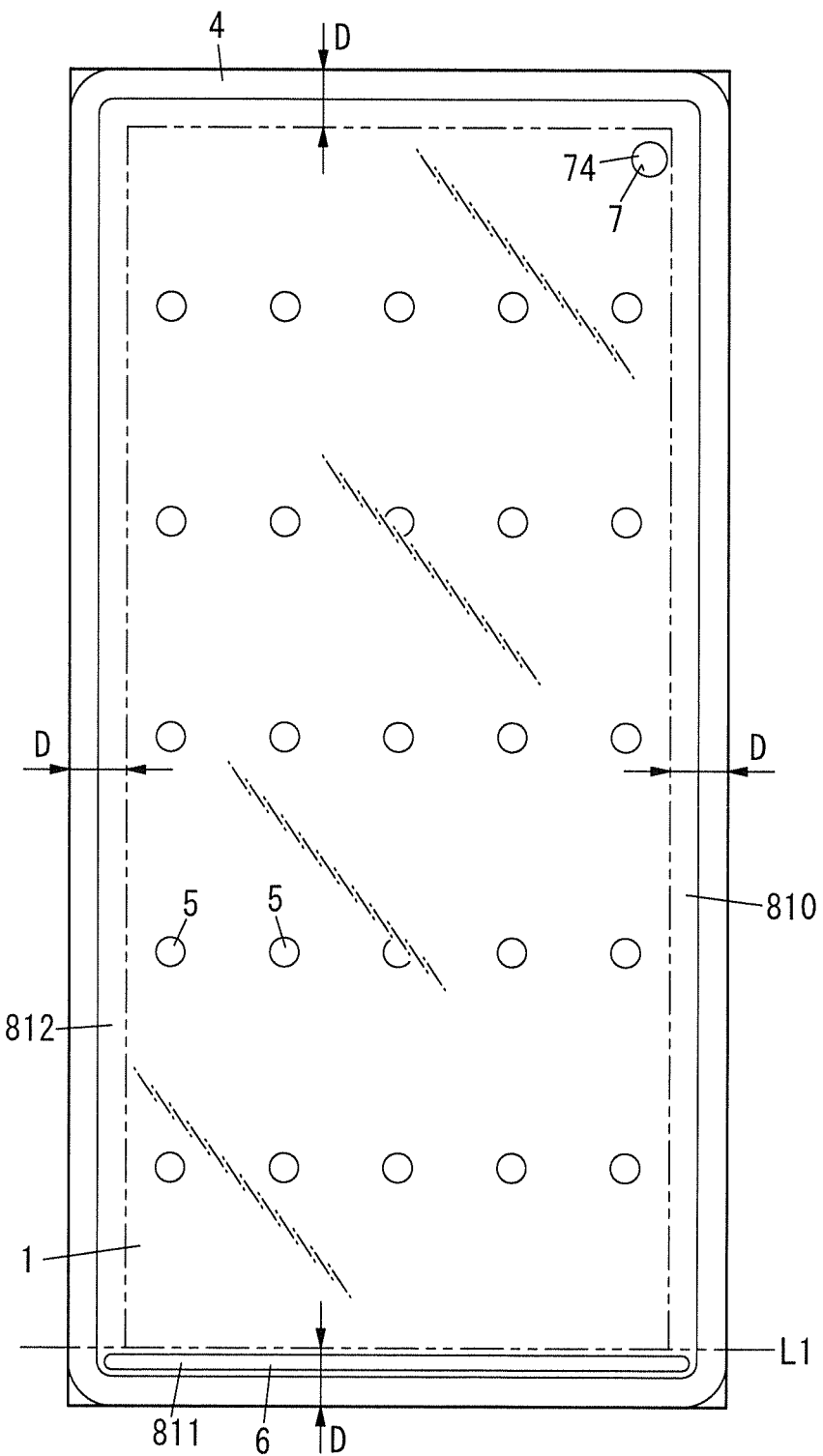
FIG. 6 is a plan view of a glass panel unit according to a second variation.
Figure 7:
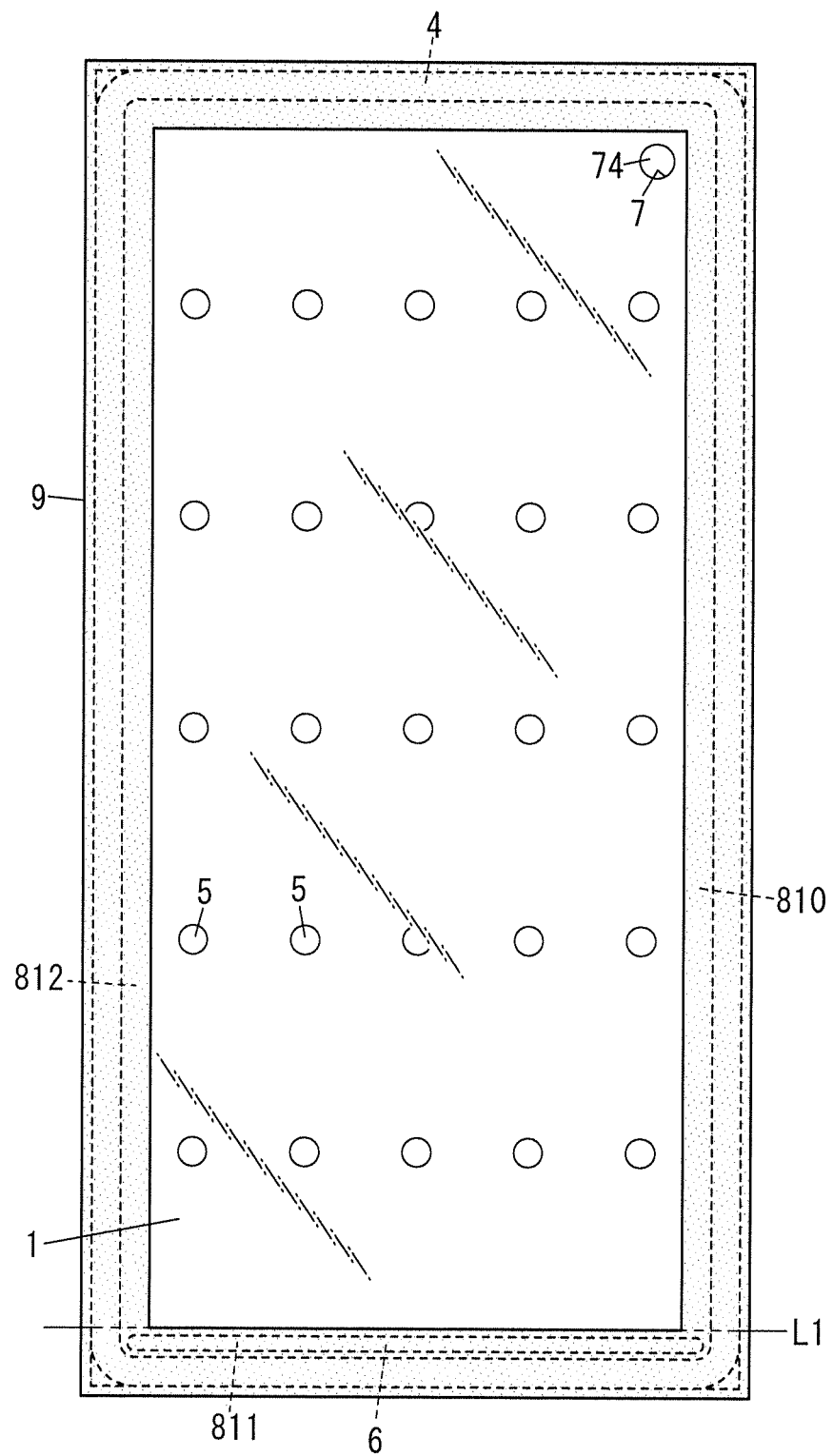
FIG. 7 is a plan view of a building component including the glass panel unit.

Next, a glass panel unit according to a second variation of the exemplary embodiment and a building component including the glass panel unit will be described with reference to FIGS. 6 and 7.

In the following description, any constituent member of the glass panel unit and building component according to the second variation, having the same function as a counterpart already described with reference to FIGS. 1-5, will be designated by the same reference numeral as that counterpart's, and a detailed description thereof will be omitted herein.

In the glass panel unit according to the second variation, the getter 6 is not arranged along the entire perimeter of the frame region 810 but arranged in only a first sub-region 811 of the frame region 810, as in the first variation.

According to the second variation, the boundary line L1, separating the first sub-region 811 and the second sub-region 812 from each other, will be located, when the building component is installed, at a lower level than the counterpart of the first variation. Specifically, the boundary line L1 will be located, when the building component is installed, at the predetermined distance D over the bottom edge of the glass panel unit according to the second variation.

Therefore, the getter 6 according to the second variation has the shape of a line extending along one side of the glass panel unit (i.e., the bottom edge of the glass panel unit installed). In other words, the getter 6 according to the second variation is configured as the first linear portion 61 according to the first variation.

In the building component according to the second variation, the sealing portion 4 and the getter 6 are also both covered with the building component frame 9 and much less easily visible.

In the building component according to the second variation, if a portion of the getter 6 dropped after the installation, that dropped portion would be hidden behind the building component frame 9 and much less easily visible.

Next, a glass panel unit according to a third variation of the exemplary embodiment and a building component including the glass panel unit will be described with reference to FIGS. 8-10.

Figure 8:
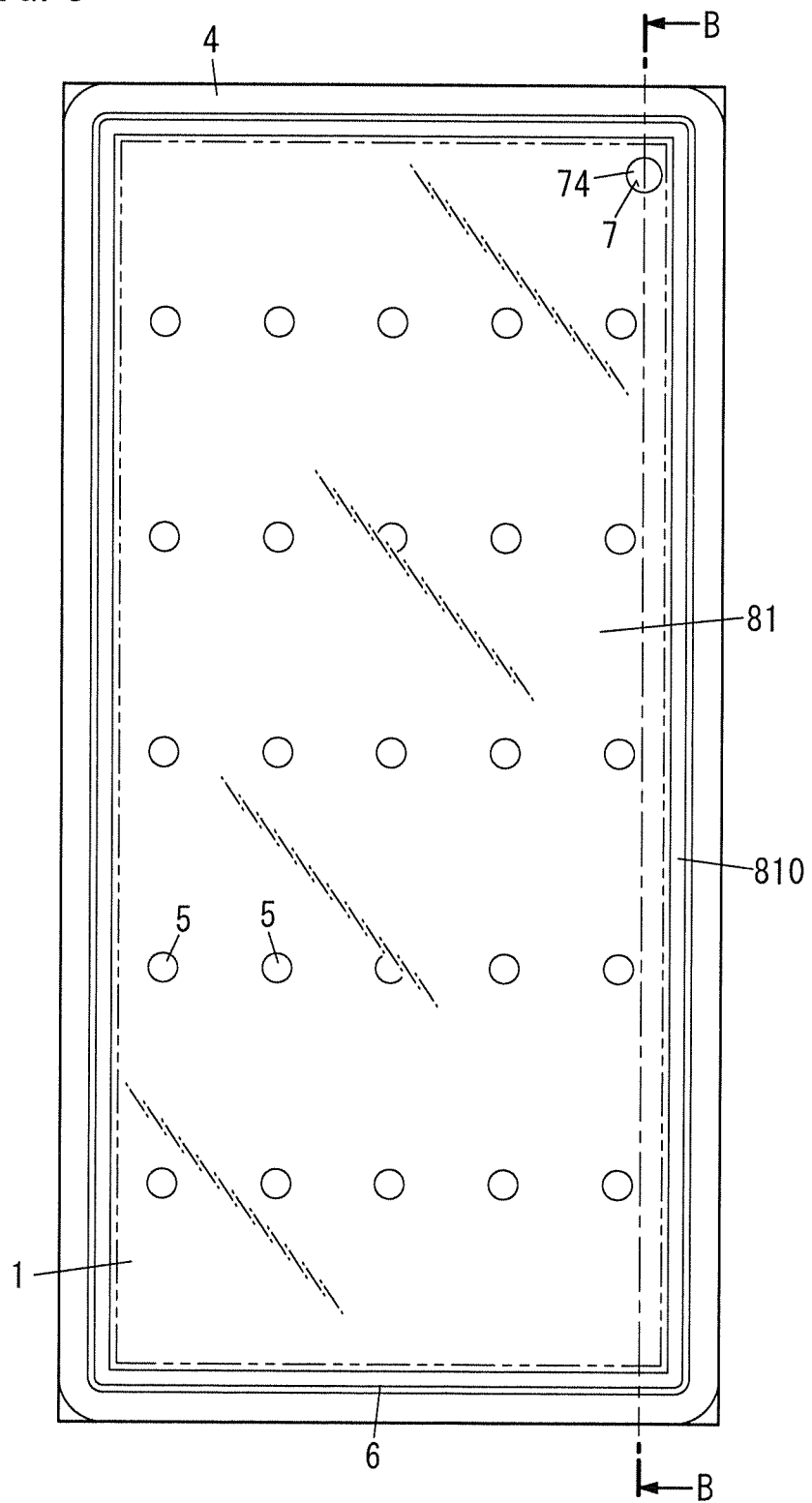
FIG. 8 is a plan view of a glass panel unit according to a third variation.
Figure 9:
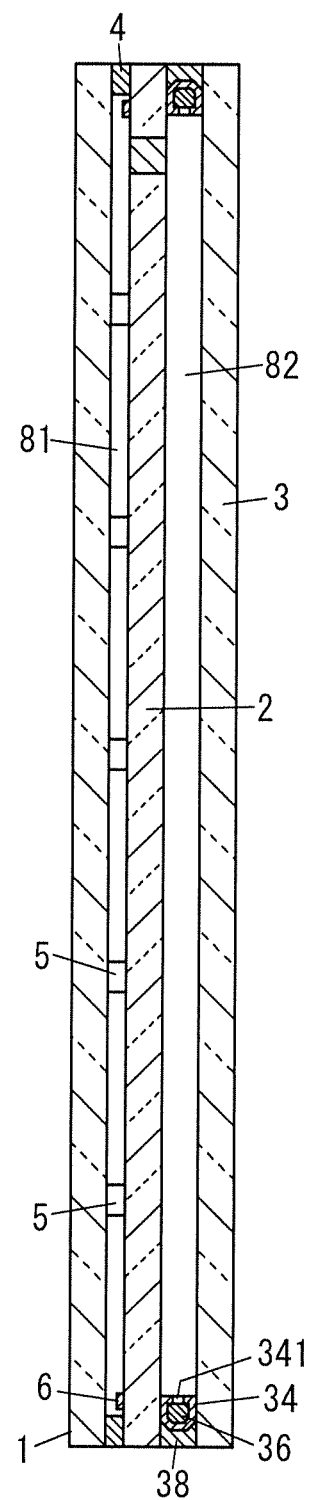
FIG. 9 is a cross-sectional view thereof taken along a plane B-B shown in FIG. 8.
Figure 10:
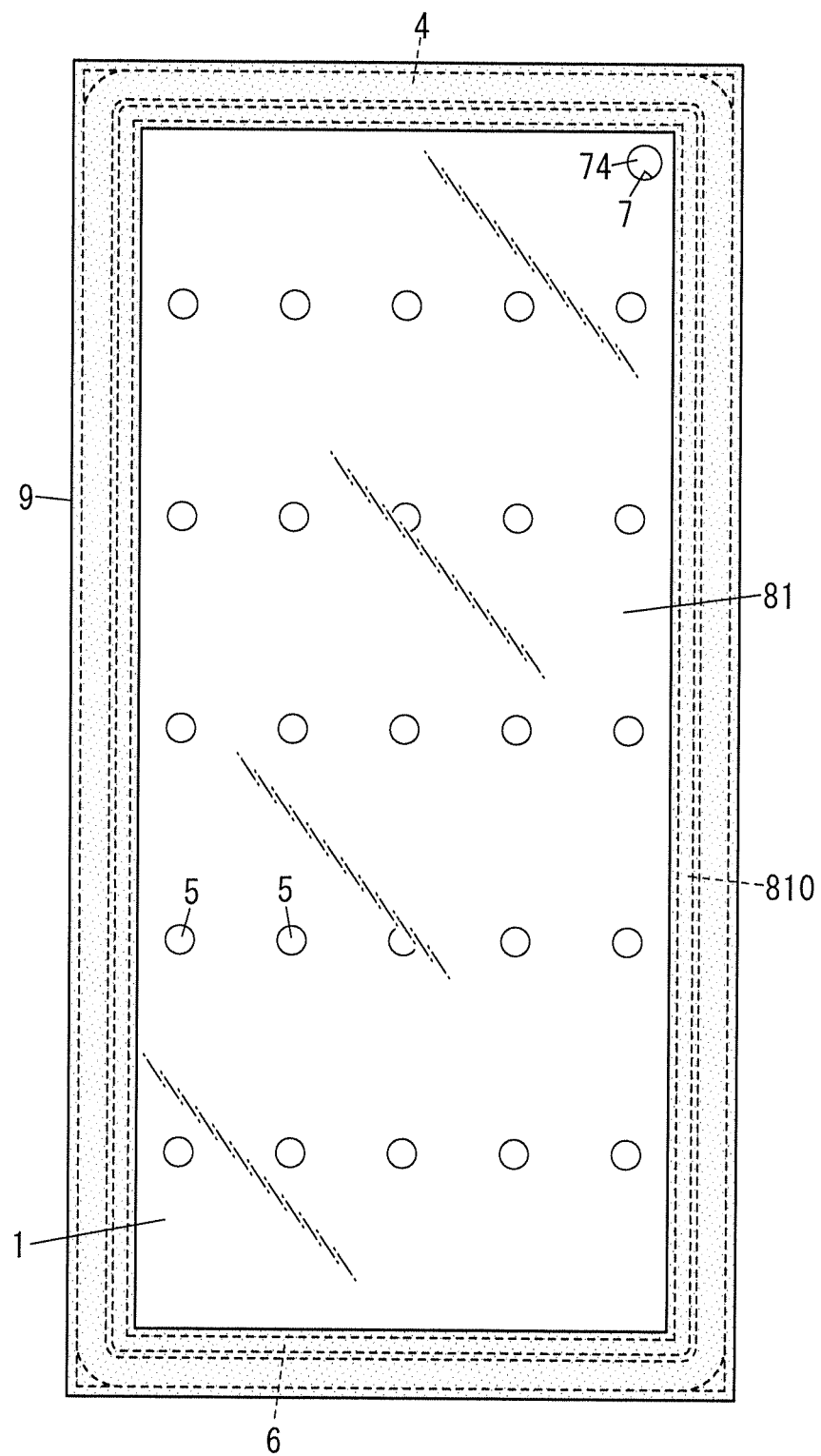
FIG. 10 is a plan view of a building component including the glass panel unit.

In a glass panel unit according to the third variation, a third glass panel 3 is further stacked over the second glass panel 2, and a second inner space 82 is formed between the third glass panel 3 and the second glass panel 2 (see FIGS. 8 and 9).

The glass panel unit according to the third variation includes: a hollow frame member 34 interposed between the respective peripheral portions of the third and second glass panels 3 and 2; a desiccant 36 filling the hollow of the frame member 34; and a second sealing portion 38 formed in the shape of a frame to cover the outer surfaces of the frame member 34. The second inner space 82 is located to be surrounded with the frame member 34 and the second sealing portion 38.

The frame member 34 is made of a metallic material such as aluminum and has through holes 341 on the inner perimeter thereof. The hollow of the frame member 34 communicates, via the through holes 341, with the second inner space 82. The desiccant 36 may be a silica gel, for example. The second sealing portion 38 may be made of a highly airtight resin such as a silicone resin or butyl rubber.

The second inner space 82 surrounded with the frame member 34 and the second sealing portion 38 between the third glass panel 3 and the second glass panel 2 is a space hermetically sealed out from the outside. The second inner space 82 may be filled with a dry gas (e.g., a dry rare gas such as argon gas or dry air).

The glass panel unit according to the third variation has, between the third and first glass panels 3 and 1 located at both ends of the thickness of the panel unit, the inner space 81, of which the pressure has been reduced to a vacuum, and the second inner space 82 filled with the dry gas, thus exhibiting excellent thermal insulation properties.

In the building component according to the third variation, the sealing portion 4 and the getter 6 are also both covered with the building component frame 9 and much less easily visible.

Optionally, the glass panel unit according to the third variation may include the generally U-shaped getter 6 according to the first variation or the linear getter 6 according to the second variation. In that case, even if a portion of the getter 6 dropped after the installation, that dropped portion would be hidden behind the building component frame 9 and much less easily visible.

As is clear from the foregoing description of embodiments and their variations, a first implementation of a glass panel unit includes a first glass panel (1), a second glass panel (2), a sealing portion (4) in a frame shape, and a getter (6) to adsorb a gas.

The second glass panel (2) is arranged to face the first glass panel (1). The sealing portion (4) hermetically bonds together respective peripheral portions of the first glass panel (1) and the second glass panel (2) so as to create an inner space (81) which is hermetically sealed at a reduced pressure between the first glass panel (1) and the second glass panel (2).

The getter (6) is arranged in the inner space (81). The getter (6) is arranged in a frame region (810), extending along the sealing portion (4), of the inner space (81) so as to be covered with a building component frame (9) when the building component frame (9) is attached onto the glass panel unit according to the first implementation. The frame region (810) is located within a predetermined distance (D) from each peripheral edge of the glass panel unit according to the first implementation.

Thus, according to the first implementation of a glass panel unit, the getter (6) arranged in the frame region (810) allows a degree of vacuum to be maintained in the inner space (81) for a long period of time, and is much less easily visible from the outside, since the getter (6) will be covered with the building component frame 9 when the building component frame (9) is attached thereto.

In a second implementation of a glass panel unit, which may be combined with the first implementation, the getter (6) is arranged along an entire perimeter of the frame region (810).

Thus, according to the second implementation of a glass panel unit, the getter (6) arranged along the entire perimeter of the frame region (810) allows a degree of vacuum to be maintained in the inner space (81) for a long period of time.

In a third implementation of a glass panel unit, which may be combined with the first implementation, the frame region (810) includes: a first sub-region (811) forming one part, located on one side in a predetermined direction, of the frame region (810) and a second sub-region (812) forming the other part, located on the other side in the predetermined direction, of the frame region (810). The getter (6) is arranged in the first sub-region (811).

Therefore, installing the glass panel unit according to the third implementation such that the first sub-region (811) is located under the second sub-region (812) would make, even if a portion of the getter (6) dropped under external impact, for example, the dropped portion much less easily visible from the outside.

A fourth implementation of a glass panel unit, which may be combined with any one of the first to third implementations, further includes a third glass panel (3) and a second inner space (502).

The third glass panel (3) is bonded hermetically onto either the first glass panel (1) or the second glass panel (2) with a second sealing portion (38) in a frame shape. The second inner space (502) is surrounded with the second sealing portion (38). A dry gas is sealed in the second inner space (502).

Thus, the glass panel unit according to the fourth implementation, including a thermally insulated inner space (81) and second inner space (82), is able to exhibit even better thermal insulation properties.

As is also clear from the foregoing description of embodiments and their variations, a first implementation of a building component includes: the glass panel unit according to any one of the first to fourth implementations; and a building component frame (9) fitted into a peripheral portion of the glass panel unit. The getter (6) is covered with the building component frame (9).

Thus, according to the first implementation of a building component, the getter (6) covered with the building component frame (9) and arranged to be much less easily visible from the outside allows a degree of vacuum to be maintained in the inner space (81) for a long period of time.

A second implementation of a building component includes: the glass panel unit according to the third implementation; and a building component frame (9) fitted into a peripheral portion of the glass panel unit. The predetermined direction is defined, when the building component according to the second implementation is installed, to be a vertical direction such that the first sub-region (811) is located under the second sub-region (812). The getter (6) located in the first sub-region (811) is covered with the building component frame (9).

Thus, according to the second implementation of a building component, the getter (6) covered with the building component frame (9) and arranged to be much less easily visible from the outside allows a degree of vacuum to be maintained in the inner space (81) for a long period of time. In addition, even if a portion of the getter (6) dropped under external impact, for example, the dropped portion would be much less easily visible from the outside.

In a third implementation of a building component, which may be combined with the second implementation, the getter (6) includes at least a linear portion (61). The linear portion (61) is a linear getter to be located along a bottom edge of the glass panel unit according to the third implementation when the building component is installed.

Thus, the third implementation of a building component would make, even if a portion of the getter (6) dropped under external impact, for example, the dropped portion much less easily visible from the outside.

In a fourth implementation of a building component, which may be combined with the second or third implementation, the glass panel unit according to the third implementation further includes: a third glass panel (3) bonded hermetically onto either the first glass panel (1) or the second glass panel (2) with a second sealing portion (38) in a frame shape, and a second inner space (82) which is surrounded with the second sealing portion (38) and in which a dry gas is sealed.

Thus, the building component according to the fourth implementation, including a thermally insulated inner space (81) and second inner space (82), exhibits even better thermal insulation properties.

Although some exemplary embodiments of a glass panel unit and a building component including the glass panel unit have been described, those embodiments should not be construed as limiting. Rather, those embodiments can be readily modified or replaced in various manners or even combined with any known technologies as appropriate depending on design choice or any other factor.

REFERENCE SIGNS LIST

1 First Glass Panel
2 Second Glass Panel
3 Third Glass Panel
4 Sealing Portion
6 Getter
9 Building Component Frame
38 Second Sealing Portion 81 Inner Space
810 Frame Region
811 First Sub-Region
812 Second Sub-Region
82 Second Inner Space
D Predetermined Distance

The invention claimed is:

1. A glass panel unit comprising:
a first glass panel;
a second glass panel arranged to face the first glass panel;
a sealing portion configured to hermetically bond together respective peripheral portions of the first glass panel and the second glass panel to create an inner space which is hermetically sealed at a reduced pressure between the first glass panel and the second glass panel; and
a getter configured to adsorb a gas and arranged in the inner space,
the glass panel unit having a plurality of peripheral edges,
the getter being arranged in a frame region, extending along the sealing portion, of the inner space to be covered with a building component frame when the building component frame is attached onto the glass panel unit,
the frame region being located within a predetermined distance from each of the plurality of peripheral edges of the glass panel unit,
the frame region comprises:
a first sub-region and a second sub-region which are opposite in a predetermined direction of the frame region,
the getter is arranged only in the first sub-region, and
the getter includes a first linear portion extending along a first side of the glass panel unit, a second linear portion extending along a second side adjacent to the first side of the glass panel unit, and a third linear portion extending along a third side adjacent to the first side of the glass panel unit.

2. The glass panel unit of claim 1, further comprising:
a third glass panel bonded hermetically onto either the first glass panel or the second glass panel with a second sealing portion, and
a second inner space which is surrounded with the second sealing portion and in which a dry gas is sealed.

3. A building component comprising:
the glass panel unit of claim 1; and
a building component frame fitted into a peripheral portion of the glass panel unit,
the getter being covered with the building component frame.

4. A building component comprising:
the glass panel unit of claim 1; and
a building component frame fitted into a peripheral portion of the glass panel unit,
the predetermined direction being defined, when the building component is installed, to be a vertical direction such that the first sub-region is located under the second sub-region,
the getter located in the first sub-region being covered with the building component frame.

5. The building component of claim 4, wherein
the glass panel unit further comprises:
a third glass panel bonded hermetically onto either the first glass panel or the second glass panel with a second sealing portion, and
a second inner space which is surrounded with the second sealing portion and in which a dry gas is sealed.

6. The glass panel unit of claim 1, wherein each of a length of the second linear portion and a length of the third linear portion are greater than half of a length of the first linear portion.

* * * * *